Sept. 10, 1935.    G. L. R. J. MESSIER    2,014,338
FEED DEVICE FOR HYDRAULIC TRANSMISSIONS
Filed Nov. 4, 1932    2 Sheets-Sheet 1
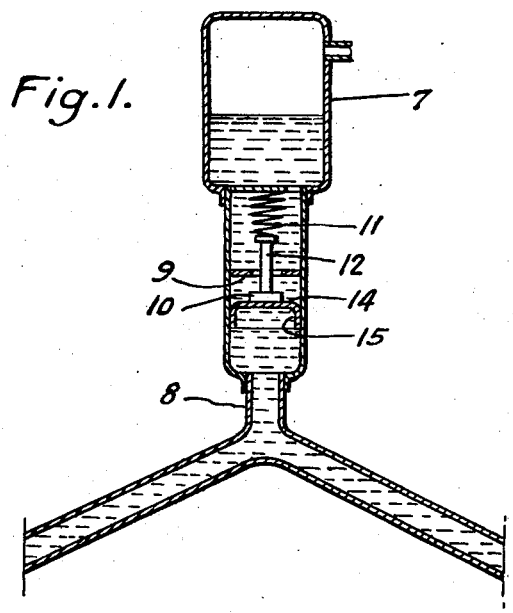
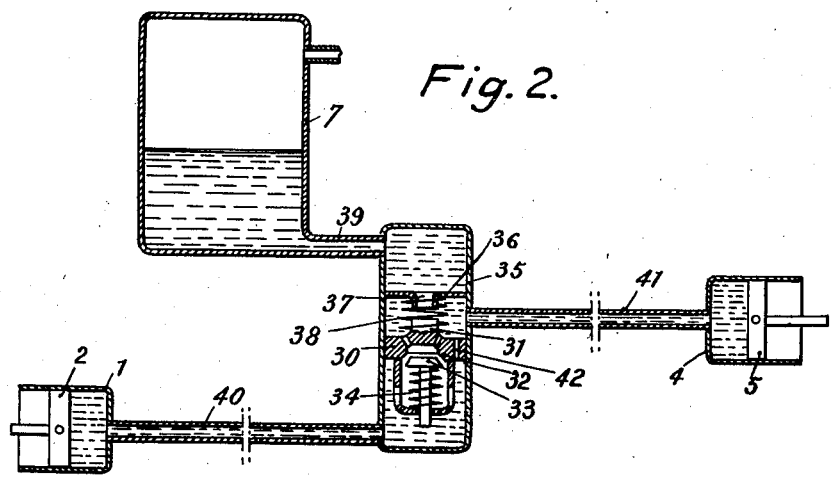

Sept. 10, 1935.   G. L. R. J. MESSIER   2,014,338
FEED DEVICE FOR HYDRAULIC TRANSMISSIONS
Filed Nov. 4, 1932   2 Sheets-Sheet 2

G. L. R. J. Messier
INVENTOR

By: Marks & Clerk
Attys.

Patented Sept. 10, 1935

2,014,338

UNITED STATES PATENT OFFICE 2,014,338

FEED DEVICE FOR HYDRAULIC TRANSMISSIONS

George Louis René Jean Messier, Montrouge, France; Yvonne Lucie Messier, born Bonnamy, administratrix of said George Louis René Jean Messier, deceased Application November 4, 1932, Serial No. 641,305
In France July 9, 1932

9 Claims. (Cl. 60—54.5)

This invention relates to improvements in the hydraulic transmission of power such, for instance, as arrangements used for the operation of brakes. The object of the invention is to provide a hydraulic transmission wherein the volume of the transmitting fluid remains constant regardless of temperature variations and leakage whereby a constant and exact displacement of the receiving member is maintained.

In the accompanying drawings wherein several embodiments of the invention are illustrated:

Fig. 1 is a sectional view of an arrangement in accordance with the invention.

Fig. 2 is a sectional view of a modification.

Figure 3:
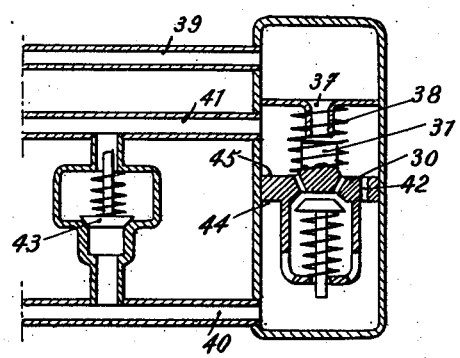
Figs. 3 and 4 are detail sectional views of two further modifications of the invention.

The feeder, illustrated in Figure 1, is mainly composed of a casing 8 containing a diaphragm 9 perforated with an orifice through which passes the rod of a valve 10. The valve 10 is normally held open by its weight, or by a spring 11, or by any other means.

The passageways about the rod 12 of the valve, the shape of the head, the weight of the valve, or the tension of the spring 11, are chosen in such a manner that, as soon as the speed of the liquid in the direction of the arrow 13 exceeds a definite value, the valve closes.

In order to ensure a more positive operation of the system, the head of the valve is provided with a piston 14 perforated with an orifice 15, so calibrated that, beyond a certain speed of flow of the liquid, the difference of pressure on both faces of the piston 14 causes the valve 10 to close.

For greater safety, use can be made, according to the invention, of an improved feeder characterized by the fact that this feeder cuts off communication with the supply tank when the pressure wave comes from the transmitter, but does not cut it off when, being open, the said feeder is subjected to a pressure wave coming from the receiver.

A form of construction of such a feeder is illustrated in Fig. 2.

It mainly comprises a casing 35 separated into two compartments by a partition 36 provided with an orifice 37 serving as a seat for a valve 31.

This valve 31 is rigid with a piston 30, provided with a seat 32 on which a second valve 33 is normally pressed by a spring 34.

A spring 38 normally holds the valve 31 away from the seat 37.

The feeder is connected, by a connecting branch 39, to the overhead supply tank 7, by the connecting branch 40, to the transmitter, and by the connecting branch 41, to the receiver.

The operation is then as follows:

At rest, as with the feeders above described, the hydraulic transmission is in communication with the supply tank.

When the transmitter is actuated, the liquid is admitted through the connecting branch 40.

If this liquid is preceded by air, the latter escapes through the orifice 42, the orifice 37 and the connecting branch 39. As soon as the liquid is admitted to the transmitter, the loss of pressure, due to its passage through the orifice 42, creates a difference of pressure between both faces of the piston 30, which latter then compresses the spring 38 and presses the valve 31 upon the seat 37. The pressure existing in the casing then holds the valve 31 on the seat 37, even when the liquid no longer passes, the tension of the spring 38 and the section of the seat 37 being calculated accordingly, as in the previous cases.

When the liquid flows back towards the transmitter, if the supply of liquid from the receiver is reduced, for instance by friction in long pipings, the pressure decreasing in the feeder, the latter opens and allows liquid coming from the supply tank to enter.

A consecutive pressure wave coming from the receiver will act on the piston 30 and will hold the valve 31 open. The excess of liquid will therefore be able to escape through the orifice 37.

The valve 33, which plays a special part, is adapted to allow, if need be, the rapid return of the liquid from the receiver to the transmitter. Its presence is optional and it might be arranged outside the feeder instead of being incorporated thereto.

The device which has just been described might, in certain cases, present the following inconvenience:

The liquid proceeding from the transmitter to the receiver is compelled to pass through the orifice 42 of reduced cross section, so that the loss of pressure can be important.

In order to avoid this inconvenience, it is possible, according to the invention, and as illustrated in Fig. 3, to associate with the preceding device a side valve 43, which allows the liquid of conduit 40 to pass in the conduit 41, when the difference of pressure between both faces 44 and 45 of the piston 30 exceeds a definite value. This valve might also be arranged in the piston 30. The fluid-tightness of the said piston and valve need not be complete when these elements are closed, since both their faces always communicate through the orifice 42, and since they simply serve, if need be, to increase the section of the passageway open to the liquid, in one direction or the other.

Figure 4:
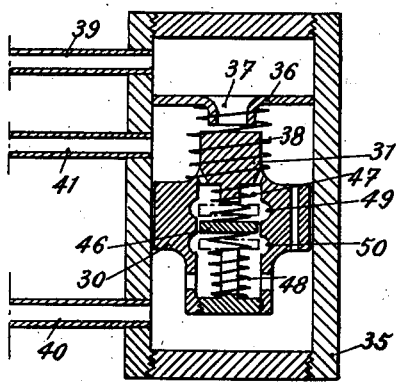

For this reason, a simpler device illustrated in Fig. 4 can be employed.

The piston 30 is provided with a housing receiving a second piston 46 subjected to the action of two springs 47 and 48. This piston 46 is capable of moving in one direction or in the other, when the hydraulic pressure, on one of its faces, exceeds a definite value allowing the compression of one of the springs 47 or 48.

This piston 46 then moves until it comes opposite the middle of one of the grooves 49—50 provided in the main piston 30, so that the liquid can then pass about the secondary piston 46.

The springs 47 and 48 can have different flexibilities, so that the pressures corresponding to the displacements of the piston 46 in one direction or in the other can be different.

I claim:

1. A hydraulic transmission comprising: a transmitting member, a receiving member, a pipe line connecting these two members and including a casing, a supply tank, said casing communicating with the said tank, a diaphragm in this casing, an orifice in this diaphragm, a valve normally held open opposite this orifice, but closing the latter as soon as the speed of a liquid flux coming from the transmitting member reaches a definite value, a piston carried by the rod of the said valve and perforated with a calibrated orifice.

2. A hydraulic transmission comprising: a transmitting member, a receiving member, a pipe line connecting these two members and including a casing, a supply tank, the said casing communicating on the one hand with the said pipe line and on the other hand with the said tank, means arranged in the said casing and acting for closing the communication between the said pipe line and the tank as soon as the speed of a liquid flux coming from the transmitting member reaches a definite value, these means allowing the said communication to be maintained when they are subjected to the action of a liquid flux coming from the receiving member.

3. A hydraulic transmission comprising: a transmitting member, a receiving member, a pipe line connecting these two members and including a casing, a supply tank, the said casing communicating on the one hand with the said pipe line and on the other hand with the said tank, means arranged in said by-pass conduit and acting for closing the latter as soon as the speed of a liquid flux coming from the transmitting member reaches a definite value, these means leaving the said by-pass conduit open when they are subjected to the action of a liquid flux coming from the receiving member, means increasing the section of the passageway open to the fluid for flowing back from the pipe line, on the receiving side, to the pipe line, on the transmitting side, when the difference of the pressures existing in these two pipe lines reaches a definite value.

4. A hydraulic transmission comprising: a transmitting member, a receiving member, a pipe line connecting these two members and including a casing, a supply tank, the said casing communicating on the one hand with the said pipe line and on the other hand with the said tank, means arranged in said by-pass conduit and acting for closing the latter as soon as the speed of a liquid flux coming from the transmitting member reaches a definite value, these means leaving the said by-pass conduit open when they are subjected to the action of a liquid flux coming from the receiving member, means increasing the section of the passageway open to the fluid flowing from the pipe line, on the transmitting side, towards the pipe line, on the receiving side, when the difference of pressure existing between these two pipe lines reaches a definite value.

5. A hydraulic transmission comprising: a transmitting member, a receiving member, a pipe line connecting these two members and including a casing, a supply tank, the said casing communicating on the one hand with the said pipe line and on the other hand with the said tank, means arranged in said by-pass conduit and acting for closing the latter as soon as the speed of a liquid flux coming from the transmitting member reaches a definite value, these means leaving the said by-pass conduit open when they are subjected to the action of a liquid flux coming from the receiving member, means increasing the section of the passageway open to the fluid for flowing back from the pipe line, on the receiving side, to the pipe line, on the transmitting side, when the difference of the pressures existing in these two pipe lines reaches a definite value, means increasing the section of the passageway open to the fluid for flowing back from the pipe line, on the transmitting side, towards the pipe line, on the receiving side, when the difference of pressure between these two pipe lines reaches a definite value, which definite values for the pressures can be different.

6. A hydraulic transmission comprising: a transmitting member, a receiving member, a pipe line connecting these two members and including a casing, a supply tank, said casing being interposed between this tank and the said pipe line, a partition dividing this casing into two compartments, an orifice in this partition, a valve having the said orifice for seat, a piston movable in the said casing and rigid with this valve, means normally holding the valve away from its seat, conduits for the passage of the liquid, provided in the said piston, conduit branches issuing from the casing and located on either side of the piston, these branches respectively leading to the transmitting member and to the receiving member.

7. A hydraulic transmission comprising: a transmitting member, a receiving member, a pipe line connecting these two members and including a casing, a supply tank, said casing being interposed between this tank and the said pipe line, a partition dividing this casing into two compartments, an orifice in this partition, a valve having the said orifice for seat, a piston movable in the said casing and rigid with this valve, means normally holding the valve away from its seat, conduits for the passage of the liquid, provided in the said piston, conduit branches issuing from the casing and located on either side of the piston, these branches respectively leading to the transmitting member and to the receiving member, a second spring valve adapted to allow, if need be, the rapid return of the liquid from the receiver towards the transmitter.

8. A hydraulic transmission comprising: a transmitting member, a receiving member, a pipe line connecting these two members and including a casing, a supply tank, said casing being interposed between this tank and the said pipe line, a partition dividing this casing into two compartments, an orifice in this partition, a valve having the said orifice for seat, a piston movable in the said casing and rigid with this valve, means normally holding the valve away from its seat, conduits for the passage of the liquid, provided in the said piston, conduit branches issuing from the casing and located on either side of the piston, these branches respectively leading to the transmitting member and to the receiving member, means arranged outside the casing and allowing the liquid to directly pass from the conduit leading to the transmitter to the conduit leading to the receiver, when the difference of pressure between both faces of the piston exceeds a definite value.

9. A hydraulic transmission, comprising: a transmitting member, a receiving member, a pipe line connecting these two members and including a casing, a supply tank, said casing being interposed between this tank and the said pipe line, a partition dividing this casing into two compartments, an orifice in this partition, a valve having the said orifice for a seat, a piston movable in the said casing and rigid with this valve, means for normally holding the valve away from its seat, conduits for the passage of the liquid, provided in the said piston, conduit branches issuing from the casing and located on either side of the piston, these branches leading to the transmitting member and to the receiving member, respectively, a secondary piston arranged within the main piston, two springs acting on either side of this secondary piston, and grooves provided in the main piston opposite the zone of displacement of the secondary piston.

GEORGE LOUIS RENÉ JEAN MESSIER.